US011521648B2

(12) United States Patent
Ho et al.

(10) Patent No.: US 11,521,648 B2
(45) Date of Patent: Dec. 6, 2022

(54) HEAT-ASSISTED MAGNETIC RECORDING (HAMR) MEDIUM WITH MULTILAYERED UNDERLAYER FOR THE RECORDING LAYER

(71) Applicant: Western Digital Technologies, Inc., San Jose, CA (US)

(72) Inventors: Hoan Cong Ho, San Jose, CA (US); Paul Christopher Dorsey, Los Altos, CA (US); Tomoko Seki, Sunnyvale, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/171,852

(22) Filed: Feb. 9, 2021

(65) Prior Publication Data

US 2022/0139422 A1   May 5, 2022

Related U.S. Application Data

(60) Provisional application No. 63/109,780, filed on Nov. 4, 2020.

(51) Int. Cl.
*G11B 5/66* (2006.01)
*G11B 5/73* (2006.01)
*G11B 5/82* (2006.01)

(52) U.S. Cl.
CPC .............. *G11B 5/66* (2013.01); *G11B 5/7369* (2019.05); *G11B 5/7375* (2019.05); *G11B 5/73919* (2019.05); *G11B 5/82* (2013.01)

(58) Field of Classification Search
CPC ....... G11B 5/66; G11B 5/7369; G11B 5/7375; G11B 5/73919; G11B 5/82
See application file for complete search history.

(56) References Cited

U.S. PATENT DOCUMENTS

| 8,941,950 B2 | 1/2015 | Yuan et al. |
| 8,993,134 B2 | 3/2015 | Varaprasad et al. |
| (Continued) | | |

OTHER PUBLICATIONS

Xu et al., Abstract—"HAMR Media Design in Optical and Thermal Aspects", IEEE Transactions on Magnetics vol. 49 Issue: 6 pp. 2559-2564.

(Continued)

*Primary Examiner* — Holly Rickman
*Assistant Examiner* — Linda N Chau
(74) *Attorney, Agent, or Firm* — Thomas R. Berthold (57) ABSTRACT

A heat-assisted magnetic recording (HAMR) medium has a multilayered underlayer between the heat-sink layer and the recording layer. One embodiment of the underlayer is a multilayer of a thermal barrier layer consisting essentially of MgO and TiO, and a seed layer containing MgO and nitrogen (N) directly on the thermal barrier layer, with the recording layer on and in contact with the seed layer. The interface between the thermal barrier layer and the seed layer contains Ti and N, some of which may be present as TiN to act as a diffusion barrier to prevent diffusion of the Ti into the recording layer. The Ti-containing thermal barrier layer has a higher thermal resistivity than the conventional MgO thermal barrier/seed layer and thus allows for reduced laser power to the recording layer while still achieving a high thermal gradient at the recording layer.

11 Claims, 6 Drawing Sheets

(56) References Cited

U.S. PATENT DOCUMENTS

| | | |
|---|---|---|
| 9,368,142 B2 | 6/2016 | Chen et al. |
| 9,406,329 B1 | 8/2016 | Ho et al. |
| 9,502,065 B1 | 11/2016 | Chang et al. |
| 9,672,854 B2 | 6/2017 | Kubota et al. |
| 9,697,859 B1 | 7/2017 | Tripathy et al. |
| 10,127,939 B2 | 11/2018 | Niwa et al. |
| 10,276,199 B1 | 4/2019 | Ho et al. |
| 10,453,487 B2 | 10/2019 | Kubota et al. |
| 10,650,854 B1 | 5/2020 | Yuan et al. |
| 2004/0191578 A1* | 9/2004 | Chen ............... G11B 5/737 |
| 2013/0314815 A1 | 11/2013 | Yuan et al. |
| 2014/0099517 A1 | 4/2014 | Hu et al. |
| 2015/0093598 A1* | 4/2015 | Kubota ............ G11B 5/7375 |
| | | 204/192.15 |

OTHER PUBLICATIONS

Chernyshov et al., "Measurement of FePt thermal properties relevant to heat-assisted magnetic recording", Journal of Applied Physics 115,17B735 (2014); doi: 10.1063/1.4866519.

\* cited by examiner

HEAT-ASSISTED MAGNETIC RECORDING (HAMR) MEDIUM WITH MULTILAYERED UNDERLAYER FOR THE RECORDING LAYER

BACKGROUND

Field of the Invention

This invention relates generally to a perpendicular magnetic recording medium for use as a heat-assisted magnetic recording (HAMR) medium, and more particularly to an improved underlayer for the recording layer.

Description of the Related Art

In conventional continuous granular magnetic recording media, the magnetic recording layer is a continuous layer of granular magnetic material over the entire surface of the disk. In magnetic recording disk drives the magnetic material (or media) for the recording layer on the disk is chosen to have sufficient coercivity such that the magnetized data regions that define the data "bits" are written precisely and retain their magnetization state until written over by new data bits. As the areal data density (the number of bits that can be recorded on a unit surface area of the disk) increases, the magnetic grains that make up the data bits can be so small that they can be demagnetized simply from thermal instability or agitation within the magnetized bit (the so-called "superparamagnetic" effect). To avoid thermal instabilities of the stored magnetization, media with high magneto-crystalline anisotropy ($K_u$) are required. The thermal stability of a magnetic grain is to a large extent determined by $K_uV$, where V is the volume of the magnetic grain. Thus a recording layer with a high $K_u$ is important for thermal stability. However, increasing $K_u$ also increases the coercivity of the media, which can exceed the write field capability of the write head.

Since it is known that the coercivity of the magnetic material of the recording layer is temperature dependent, one proposed solution to the thermal stability problem is heat-assisted magnetic recording (HAMR), wherein the magnetic recording material is heated locally during writing to lower the coercivity enough for writing to occur, but where the coercivity/anisotropy is high enough for thermal stability of the recorded bits at the ambient temperature of the disk drive (i.e., the normal operating temperature range of approximately 15-60° C.). In some proposed HAMR systems, the magnetic recording material is heated to near or above its Curie temperature. The recorded data is then read back at ambient temperature by a conventional magnetoresistive read head.

The most common type of proposed HAMR disk drive uses a laser source and an optical waveguide with a near-field transducer (NFT). A "near-field" transducer refers to "near-field optics", wherein the passage of light is through an element with sub-wavelength features and the light is coupled to a second element, such as a substrate like a magnetic recording medium, located a sub-wavelength distance from the first element. The NFT is typically located at the gas-bearing surface (GBS) of the gas-bearing slider that also supports the read/write head and rides or "flies" above the disk surface.

One type of proposed high-$K_u$ HAMR media with perpendicular magnetic anisotropy is an alloy of FePt (or CoPt) alloy chemically-ordered in the $L1_0$ phase. The chemically-ordered FePt alloy, in its bulk form, is known as a face-centered tetragonal (FCT) $L1_0$-ordered phase material (also called a CuAu material). The c-axis of the $L1_0$ phase is the easy axis of magnetization and is oriented perpendicular to the disk substrate. The FePt alloy requires deposition at high temperature or subsequent high-temperature annealing to achieve the desired chemical ordering to the $L1_0$ phase.

The FePt alloy magnetic layer also typically includes a segregant like C, $SiO_2$, $TiO_2$, $TaO_x$, $ZrO_2$, SiC, SiN, TiC, TiN, B, BC or BN that forms between the FePt grains and reduces the grain size. To obtain the required microstructure and magnetic properties, the FePt needs to be deposited with the substrate maintained at high temperatures (e.g., about 500 to 700° C.). In HAMR media, a MgO underlayer is used as a seed layer to induce the desirable (001) texture to the FePt magnetic grains and influence their geometrical microstructure and to also act as a thermal barrier layer so that heat from the NFT is not dissipated too rapidly from the FePt recording layer.

SUMMARY

However, a problem associated with a HAMR disk is optimization of the amount of heat to the FePt recording layer. If the thermal conductivity of the MgO thermal barrier/seed layer is too high the heat from the NFT will be distributed too rapidly, which will require more laser power to heat the FePt material. This is undesirable because the increased laser power can potentially shorten HAMR drive lifetime. If the thermal conductivity of the MgO thermal barrier/seed layer is too low (high thermal resistivity) the heat from the NFT will be confined to the FePt recording layer and will spread laterally through the recording layer. This is undesirable because the lateral spreading of the heat may cause recorded data in adjacent data tracks to be overwritten. Thus it is desirable that the recording layer has a high thermal gradient, meaning there is a sharp drop in temperature at the edges of the bits being recorded. In an attempt to optimize the heat to the recording layer a heat-sink layer is located below the MgO thermal barrier/seed layer to facilitate the transfer of heat away from the FePt recording layer. The heat-sink layer is typically a single layer or multilayer of a material that is a good thermal conductor, like Cu, Au, Ag, Cr, Mo or W or other suitable metals or metal alloys. However, even with the use of a heat-sink, it is difficult to minimize laser power while still providing a high thermal gradient to the recording layer.

Embodiments of the invention relate to a HAMR medium with a multilayered underlayer between the heat-sink layer and the recording layer. In one embodiment the multilayered underlayer is a thermal barrier layer consisting essentially of MgO and TiO, and a seed layer containing MgO and nitrogen (N) directly on the thermal barrier layer, with the recording layer on and in contact with the seed layer. The interface between the thermal barrier layer and the seed layer contains Ti and N, some of which may be present as TiN to act as a diffusion barrier to prevent diffusion of the Ti into the recording layer. The Ti-containing thermal barrier layer has a higher thermal resistivity than MgO and thus allows for reduced laser power while still achieving a high thermal gradient.

For a fuller understanding of the nature and advantages of the present invention, reference should be made to the following detailed description taken together with the accompanying figures.

DETAILED DESCRIPTION

Figure 1:
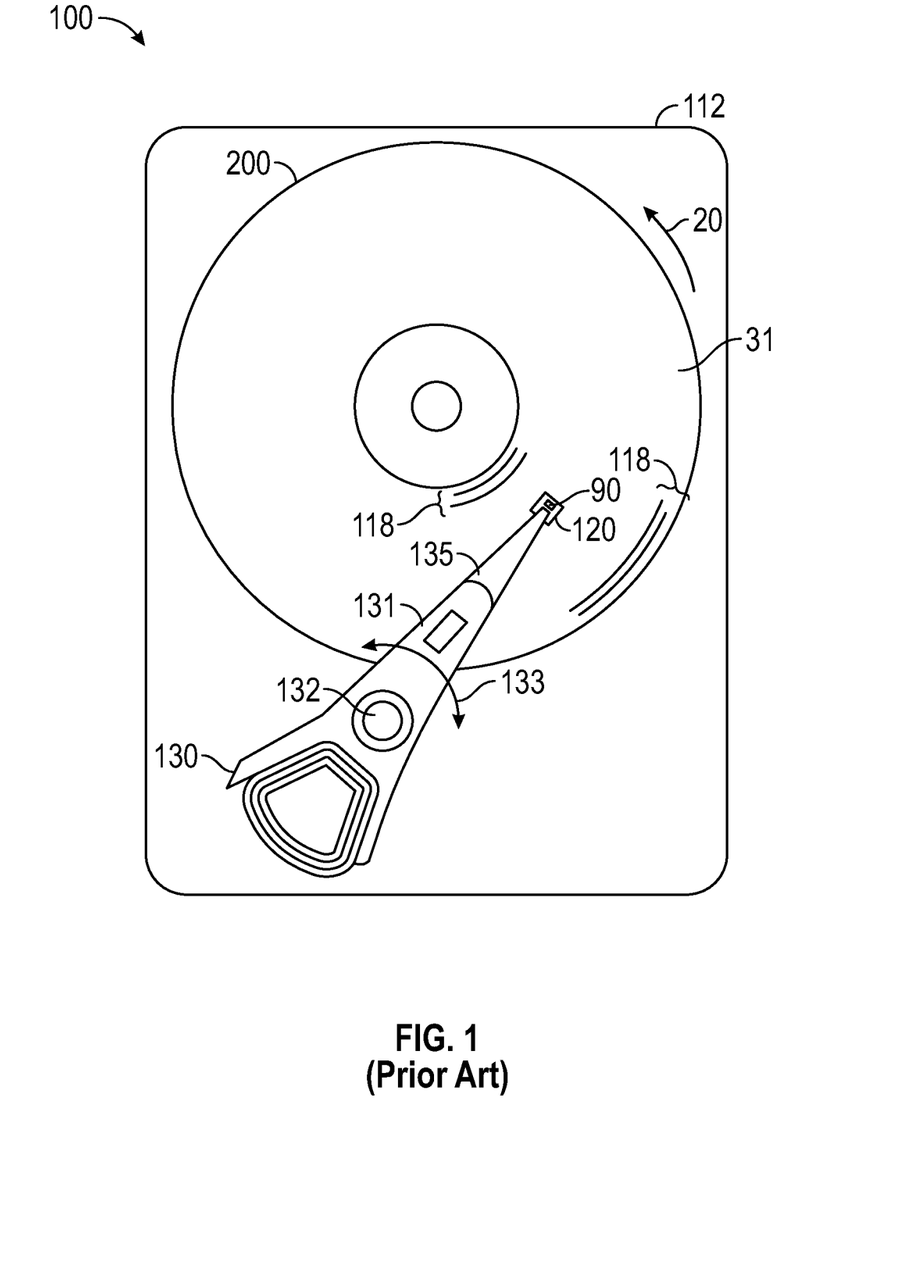
FIG. 1 is a top view of a heat-assisted magnetic recording (HAMR) disk drive according to the prior art.

FIG. 1 is a top view of a heat-assisted magnetic recording (HAMR) disk drive 100 according to the prior art. In FIG. 1, the HAMR disk drive 100 is depicted with a disk 200 with a continuous magnetic recording layer 31 with concentric circular data tracks 118. Only a portion of a few representative tracks 118 near the inner and outer diameters of disk 200 are shown.

The drive 100 has a housing or base 112 that supports an actuator 130 and a drive motor for rotating the magnetic recording disk 200. The actuator 130 may be a voice coil motor (VCM) rotary actuator that has a rigid arm 131 and rotates about pivot 132 as shown by arrow 133. A head-suspension assembly includes a suspension 135 that has one end attached to the end of actuator arm 131 and a head carrier, such as a gas-bearing slider 120, attached to the other end of suspension 135. The suspension 135 permits the slider 120 to be maintained very close to the surface of disk 200 and enables it to "pitch" and "roll" on the gas-bearing (typically air or helium) generated by the disk 200 as it rotates in the direction of arrow 20. The slider 120 supports the HAMR head (not shown), which includes a magnetoresistive read head, an inductive write head, the near-field transducer (NFT) and optical waveguide. A semiconductor laser 90, for example with a wavelength of 780 to 980 nm, may be used as the HAMR light source and is depicted as being supported on the top of slider 120. Alternatively, the laser may be located on suspension 135 and coupled to slider 120 by an optical channel. As the disk 200 rotates in the direction of arrow 20, the movement of actuator 130 allows the HAMR head on the slider 120 to access different data tracks 118 on disk 200. The slider 120 is typically formed of a composite material, such as a composite of alumina/titanium-carbide ($Al_2O_3$/TiC). Only one disk surface with associated slider and read/write head is shown in FIG. 1, but there are typically multiple disks stacked on a hub that is rotated by a spindle motor, with a separate slider and HAMR head associated with each surface of each disk.

Figure 2:
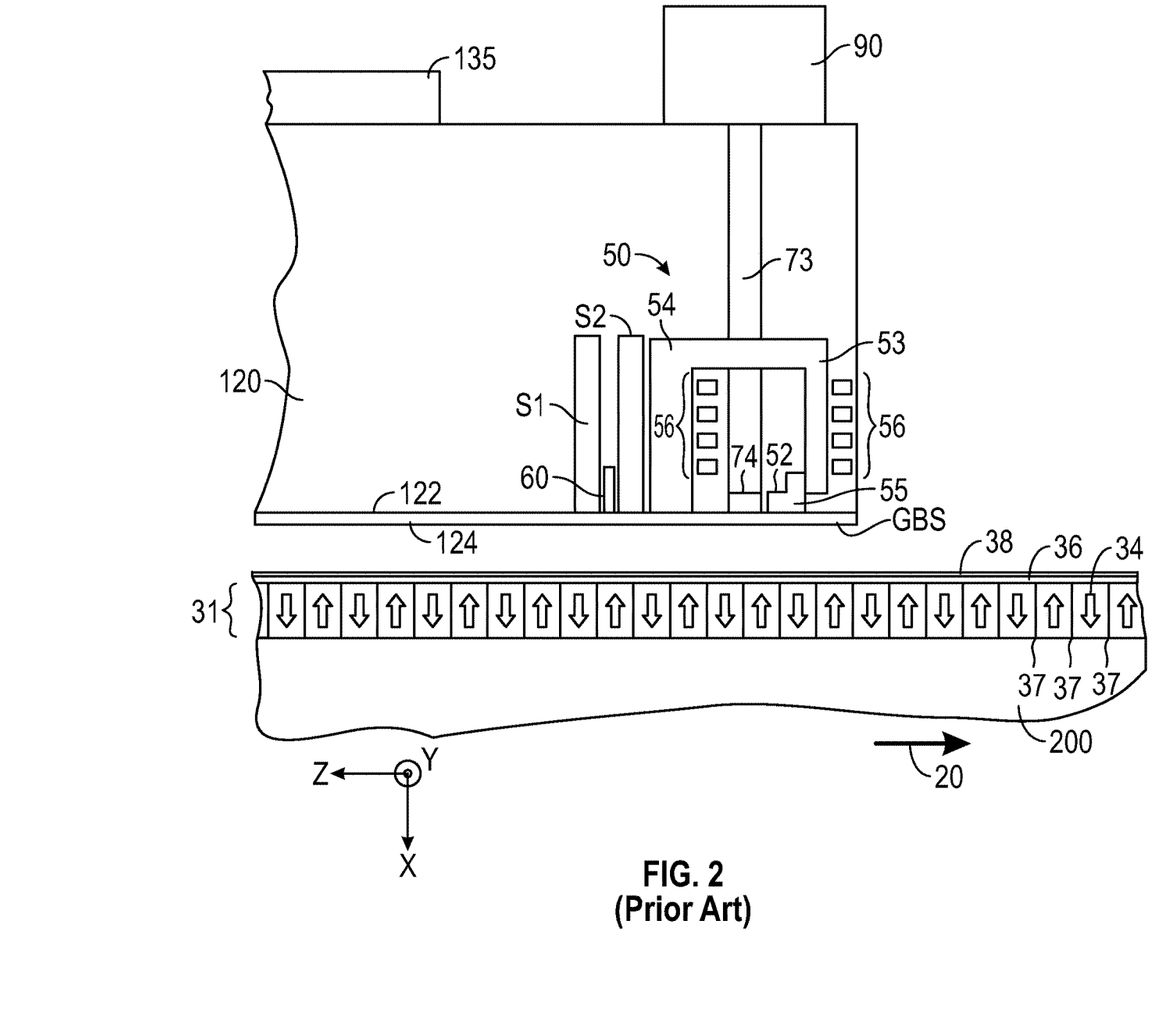
FIG. 2 depicts a sectional view, not drawn to scale because of the difficulty in showing the very small features, of a gas-bearing slider for use in HAMR disk drive and a portion of a HAMR disk according to the prior.

In FIG. 2, the X direction denotes a direction perpendicular to the gas-bearing surface (GBS) of the slider, the Y direction denotes a track width or cross-track direction, and the Z direction denotes an along-the-track direction. FIG. 2 is a schematic cross-sectional view illustrating a configuration example of a HAMR head according to the prior art, which is also capable of functioning as the HAMR head in embodiments of this invention. In FIG. 2, the disk 200 is depicted as a conventional disk with the HAMR recording layer 31 being a continuous non-patterned magnetic recording layer of magnetizable material with magnetized regions or "bits" 34. The bits 34 are physically adjacent to one another and the boundaries of adjacent bits are referred to as magnetic transitions 37. The bits are recorded in individual data sectors. The recording layer 31 is typically formed of a high-anisotropy ($K_u$) substantially chemically-ordered FePt alloy (or CoPt alloy) with perpendicular magnetic anisotropy. The disk includes an overcoat 36, typically formed of amorphous diamond-like carbon (DLC), and a liquid lubricant layer 38, typically a bonded perfluropolyether (PFPE).

The gas-bearing slider 120 is supported by suspension 135. The slider 120 has a recording-layer-facing surface 122 onto which an overcoat 124 is deposited. The overcoat 124 is typically a DLC overcoat with a thickness in the range of about 10 to 30 Å and whose outer surface forms the GBS of the slider 120. An optional adhesion film or undercoat (not shown), such as a 1 to 5 Å silicon nitride ($SiN_x$) film, may be deposited on the surface 122 before deposition of the overcoat 124. The slider 120 supports the magnetic write head 50, magnetoresistive (MR) read head 60, and magnetically permeable read head shields S1 and S2. A recording magnetic field is generated by the write head 50 made up of a coil 56, a main magnetic pole 53 for transmitting flux generated by the coil 56, a write pole 55 with end 52, and a return pole 54. A magnetic field generated by the coil 56 is transmitted through the magnetic pole 53 to the write pole end 52 located near an optical near-field transducer (NFT) 74. The write head 50 is typically capable of operating at different clock rates so as to be able to write data at different frequencies. The NFT 74, also known as a plasmonic antenna, typically uses a low-loss metal (e.g., Au, Ag, Al or Cu) shaped in such a way to concentrate surface charge motion at a tip located at the slider GBS when light from the waveguide 73 is incident. Oscillating tip charge creates an intense near-field pattern, heating the recording layer 31. Sometimes, the metal structure of the NFT can create resonant charge motion (surface plasmons) to further increase intensity and heating of the recording layer. At the moment of recording, the recording layer 31 of disk 200 is heated by the optical near-field generated by the NFT 74 and, at the same time, a region or "bit" 34 is magnetized and thus written onto the recording layer 31 by applying a recording magnetic field generated by the write pole end 52. It is important that the heat from NFT 74 be focused just at the bit being recorded so that adjacent regions of the recording layer are not recorded or overwritten. Thus the heat at the recording layer should have a high thermal gradient, meaning there is a sharp reduction in heat at the edges of the bit being recorded.

A semiconductor laser 90 is mounted to the top surface of slider 120. An optical waveguide 73 for guiding light from laser 90 to the NFT 74 is formed inside the slider 120. The laser 90 is typically capable of operating at different power levels. Materials that ensure a refractive index of the waveguide 73 core material to be greater than a refractive index of the cladding material may be used for the waveguide 73. For example, $Al_2O_3$ may be used as the cladding material and $TiO_2$, $Ta_2O_5$ and $SiO_xN_y$ as the core material. Alternatively, $SiO_2$ may be used as the cladding material and $Ta_2O_5$, $TiO_2$, $SiO_xN_y$, or Ge-doped $SiO_2$ as the core material. The waveguide 73 that delivers light to NFT 74 is preferably a single-mode waveguide.

Figure 3:
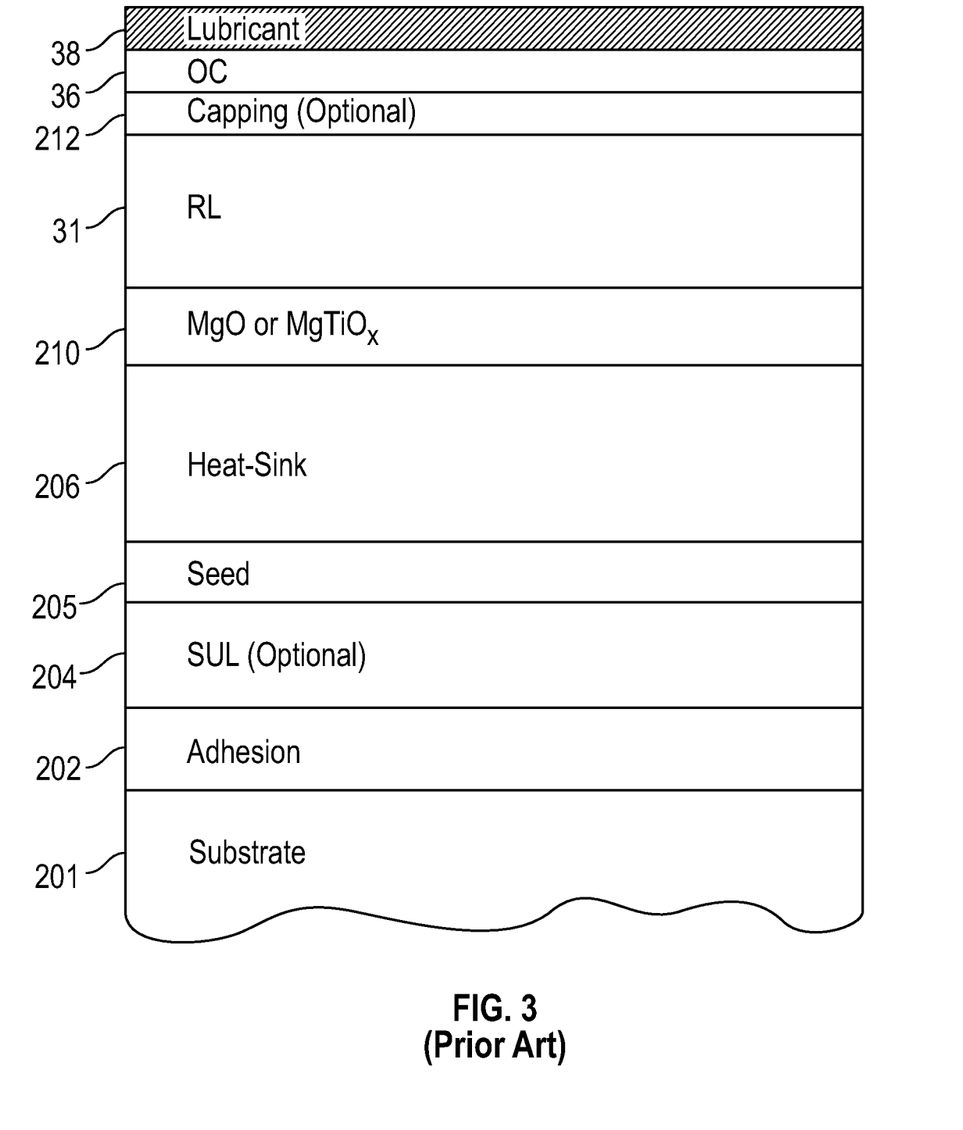
FIG. 3 is a sectional view showing a HAMR disk with a single heat-sink layer according to the prior art.

FIG. 3 is a sectional view showing HAMR disk 200 with a continuous granular recording layer (RL) 31 according to the prior art. The recording layer 31 may be comprised of a substantially chemically-ordered FePt alloy (or CoPt alloy) as proposed in the prior art. The disk 200 is a substrate 201 having a generally planar surface on which the representative layers are sequentially deposited, typically by sputtering. The hard disk substrate 201 may be any commercially available high-temperature glass substrate, but may also be an alternative substrate, such as silicon or silicon-carbide. An adhesion layer 202, typically about 10-200 nm of an amorphous adhesion layer material like a CrTa or NiTa alloy, is deposited on substrate 201.

An optional soft underlayer (SUL) 204 of magnetically permeable material that serves as a flux return path for the magnetic flux from the write head may be formed on the adhesion layer 202. The SUL 204 may be formed of magnetically permeable materials that are also compatible with the high-temperature deposition process for FePt, such as certain alloys of CoFeZr and CoZr. The SUL 204 may also be a laminated or multilayered SUL formed of multiple soft magnetic films separated by nonmagnetic films, such as electrically conductive films of Al or CoCr. The SUL 204 may also be a laminated or multilayered SUL formed of multiple soft magnetic films separated by interlayer films that mediate an antiferromagnetic coupling, such as Ru, Ir, or Cr or alloys thereof. The SUL 204 may have a thickness in the range of about 5 to 100 nm.

A seed layer 205, for example a layer of RuAl or NiAl, is deposited on SUL 204, or on adhesion layer 202 if no SUL is used. A heat-sink layer 206 is then deposited on seed layer 205. The heat-sink layer 206 facilitates the transfer of heat away from the RL to prevent spreading of heat to regions of the RL adjacent to where data is desired to be written, thus preventing overwriting of data in adjacent data tracks. The heat-sink layer 206 may be one or more layers formed of a material with high thermal conductivity, like Cu, Au, Ag, Cr, Mo or W or other suitable metals or metal alloys, with a typical thickness between about 5-200 nm.

An underlayer layer 210 is formed on the heat-sink layer 206 and acts as both the seed layer for the RL 31 and a thermal barrier layer. The underlayer is typically a single layer of MgO radio-frequency (RF) sputter deposited in pure argon (Ar) that acts as both a seed layer and a thermal barrier layer. An underlayer of a single layer of $MgTiO_x$ has also been proposed, as described in U.S. Pat. No. 8,993,134 B2, which is assigned to the same assignee as this application. Because the $MgTiO_x$ underlayer is electrically conductive it can be deposited by direct-current (DC) sputtering which provides a faster deposition rate than RF sputtering. The $MgTiO_x$ underlayer is DC sputter deposited in Ar and has a higher thermal resistance than MgO, so it acts as a better thermal barrier layer, which allows for reduced laser power to heat the recording layer.

The perpendicular media that forms the RL 31 is a high-anisotropy ($K_u$) substantially chemically-ordered FePt alloy (or CoPt alloy) with perpendicular magnetic anisotropy. Substantially chemically-ordered means that the FePt alloy has a composition of the form $Fe_{(y)}Pt_{(100-y)}$ where y is between about 45 and 55 atomic percent. Such alloys of FePt (and CoPt) ordered in $L1_0$ are known for their high magnetocrystalline anisotropy and magnetization, properties that are desirable for high-density magnetic recording materials. The substantially chemically-ordered FePt alloy, in its bulk form, is known as a face-centered tetragonal (FCT) $L1_0$-ordered phase material (also called a CuAu material). The c-axis of the $L1_0$ phase is the easy axis of magnetization and is oriented perpendicular to the disk substrate. The substantially chemically-ordered FePt alloy may also be a pseudo-binary alloy based on the FePt $L1_0$ phase, e.g., $(Fe_{(y)}Pt_{(100-y)})$—X, where y is between about 45 and 55 atomic percent and the element X may be one or more of Ni, Au, Cu, Pd, Mn and Ag and present in the range of between about 0% to about 20% atomic percent. While the pseudo-binary alloy in general has similarly high anisotropy as the binary alloy FePt, it allows additional control over the magnetic and other properties of the RL. For example, Ag improves the formation of the $L1_0$ phase and Cu reduces the Curie temperature. While embodiments will be described for media with a FePt RL, the media may also include recording layers formed of CoPt (or a pseudo-binary CoPt—X alloy based on the CoPt $L1_0$ phase).

FePt $L1_0$ phase based granular thin films exhibit strong perpendicular anisotropy, which potentially leads to small thermally stable grains for ultrahigh density magnetic recording. To fabricate small grain FePt $L1_0$ media some form of segregant to separate grains can be used as an integral part of the magnetic recording layer. Thus in the HAMR, the RL 31 also typically includes a segregant, such as one or more of C, $SiO_2$, $TiO_2$, $TaO_x$, $ZrO_2$, SiC, SiN, TiC, TiN, B, BC, and BN that forms between the FePt grains and reduces the grain size. While FIG. 3 depicts the RL 31 as a single magnetic layer, the recording layer may be a multi-layer, for example multiple stacked FePt sublayers, each with a different segregant, as described in U.S. Pat. No. 9,406,329 B1 which is assigned to the same assignee as this application.

The FePt RL is sputter deposited, typically to a thickness of between about 4 to 15 nm, while the disk substrate 201 is maintained at an elevated temperature, for example between about 300 and 700° C. The FePt RL may be sputter deposited from a single composite target having generally equal atomic amounts of Fe and Pt and with the desired amounts of X-additives and segregant, or co-sputtered from separate targets.

An optional capping layer 212, such as a thin film of Co, may be formed on the RL 31. A protective overcoat (OC) 36 is deposited on the RL 31 (or on the optional capping layer 212), typically to a thickness between about 1-5 nm. OC 36 is preferably a layer of amorphous diamond-like carbon (DLC). The DLC may also be hydrogenated and/or nitrogenated, as is well-known in the art. On the completed disk, a liquid lubricant 38, like a perfluorpolyether (PFPE), is coated on OC 36.

Figure 4:
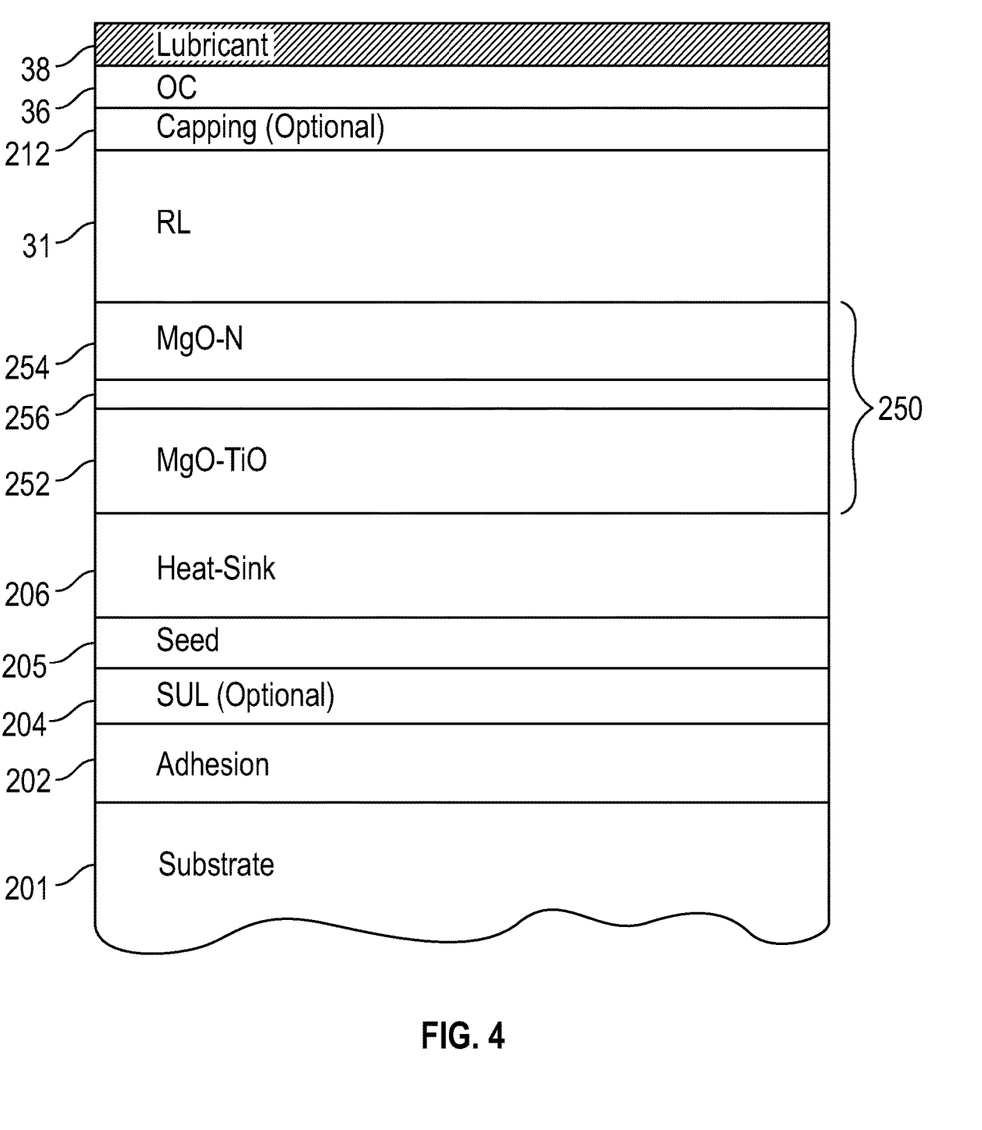
FIG. 4 is a sectional view showing a HAMR disk with a multilayered underlayer below the recording layer according to an embodiment of the invention.

FIG. 4 is a sectional view showing a HAMR disk with a continuous granular recording layer (RL) 31 with a multi-layered underlayer 250 below the RL according to an embodiment of the invention. The multilayered underlayer between the heat-sink layer 206 and the RL 31 includes a thermal barrier layer 252 consisting essentially of MgO and TiO (which may be referred to as $MgTiO_x$ or MTO), a seed layer 254 comprising MgO and nitrogen (N) for the RL 31, and a diffusion barrier 256 comprising Ti and N between the thermal barrier layer 252 and the seed layer 254. The RL 31 is formed on and in contact with the MgO—N seed layer 254. The lower thermal barrier layer 252 is $MgTiO_x$ DC sputter deposited only in Ar (without $N_2$) to a thickness preferably in the range of 2 to 6 nm. It may be deposited from a MgO—TiO target, with the TiO being at least 40 atomic percent of the resulting layer. The $MgTiO_x$ layer 252 may optionally be etched to reduce its surface roughness, for example by physical plasma etching using Ar or Kr gas, prior to deposition of the seed layer 254. The upper seed layer 254 is MgO—N, which results from MgO RF sputter deposited in the presence of Ar+$N_2$, with $N_2$ being in the range of 9% to 66% of the gas. The seed layer 254 may have a thickness preferably in the range of 1 to 5 nm. During heating of the substrate to form the FePt RL 31, Ti and N migrate to the boundary between the thermal barrier layer 252 and seed layer 254 to form diffusion barrier 256.

As part of the development of embodiments of this invention it was discovered that a single layer $MgTiO_x$ thermal barrier/seed layer DC sputter deposited in the presence of Ar (layer 210 in FIG. 3) results in reduced recording performance, for example reduced signal-to-noise ratio (SNR) of the readback signal and increased media transition jitter (the measured position deviation of the readback pulse from its ideal position). This is believed due to diffusion of the titanium (Ti) into the recording layer when the substrate is heated during deposition of the FePt. In an attempt to reduce the diffusion of Ti, the single layer of $MgTiO_x$ was DC sputter deposited in Ar+$N_2$, resulting in a single layer of $MgTiO_x$—N as both the seed and thermal barrier layer. A HAMR medium with this underlayer is described in U.S. Pat. No. 9,672,854 B2. This medium with the $MgTiO_x$—N underlayer had significantly worse coercivity (Hc) and nucleation field (Hn) than a medium with a conventional MgO underlayer. Thus it is believed that the nitrogen did not substantially inhibit diffusion of the Ti. Also, the nitrogen increases the lattice of the $MgTiO_x$ underlayer, which negatively impacts its growth on the heat-sink layer (e.g., Cr) and the texture of the subsequently deposited FePt. The change in the lattice with $N_2$ injection is due to the formation of TiN and TiON, both of which have a larger lattice than TiO. Thus, in certain embodiments of this invention, the $MgTiO_x$ thermal barrier layer 252 is sputter deposited in pure Ar to minimize the lattice mismatch between the underlying heat-sink layer 206 and the upper seed layer 254.

It has been discovered that in a multilayer structure of the underlayer 250 according to embodiments of the invention as shown and described in FIG. 4, if the upper layer is MgO sputter deposited in Ar+$N_2$, instead of the conventional MgO sputter deposited only in Ar, significant improvements in magnetic recording result. This is explained with FIGS. 5A-5B and 6.

Figure 5A:
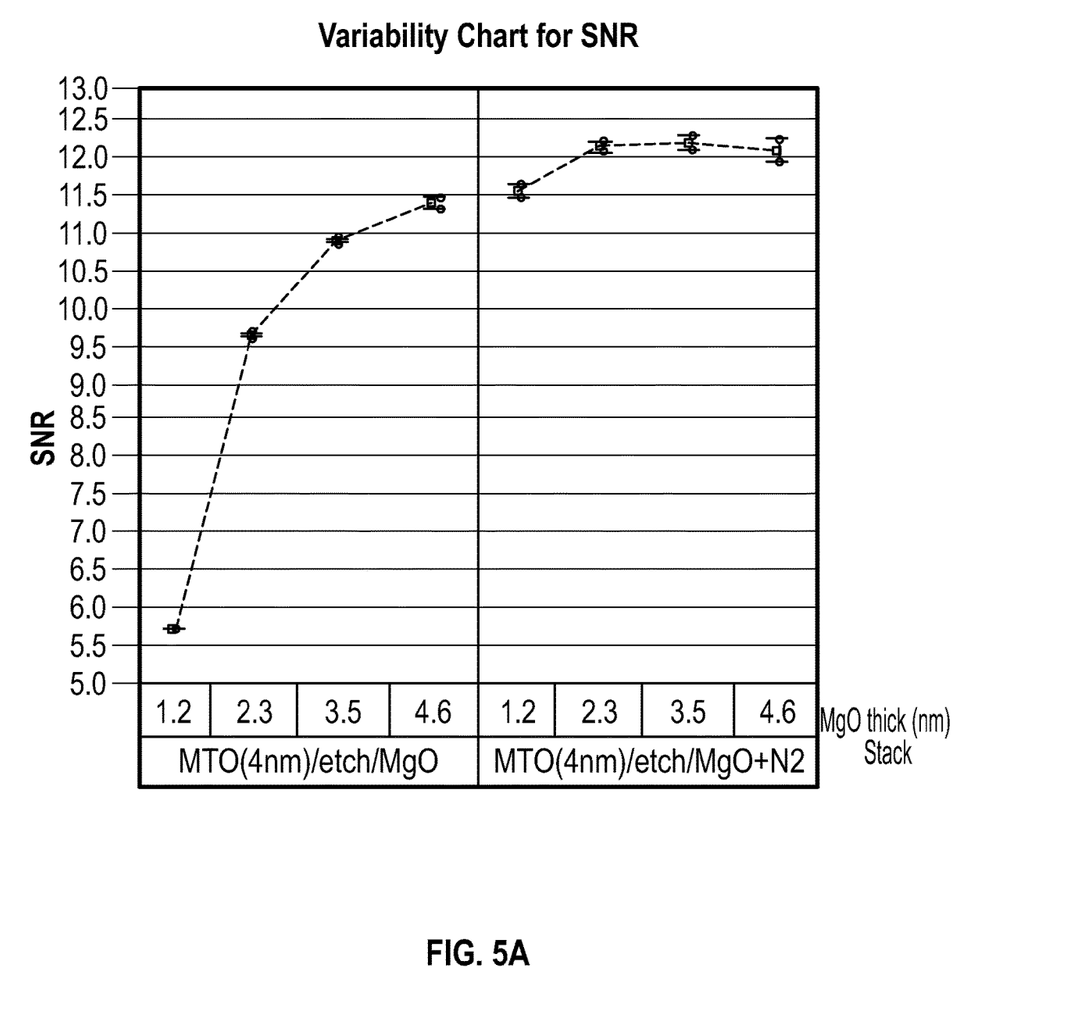
FIG. 5A is a graph comparing the SNR for a HAMR medium with a multilayer of $MgTiO_x$(Ar only)/MgO(Ar only) and a HAMR medium with a multilayer of $MgTiO_x$(Ar only)/MgO—N(Ar+$N_2$) for various thicknesses of the upper MgO and MgO—N seed layers.
Figure 5B:
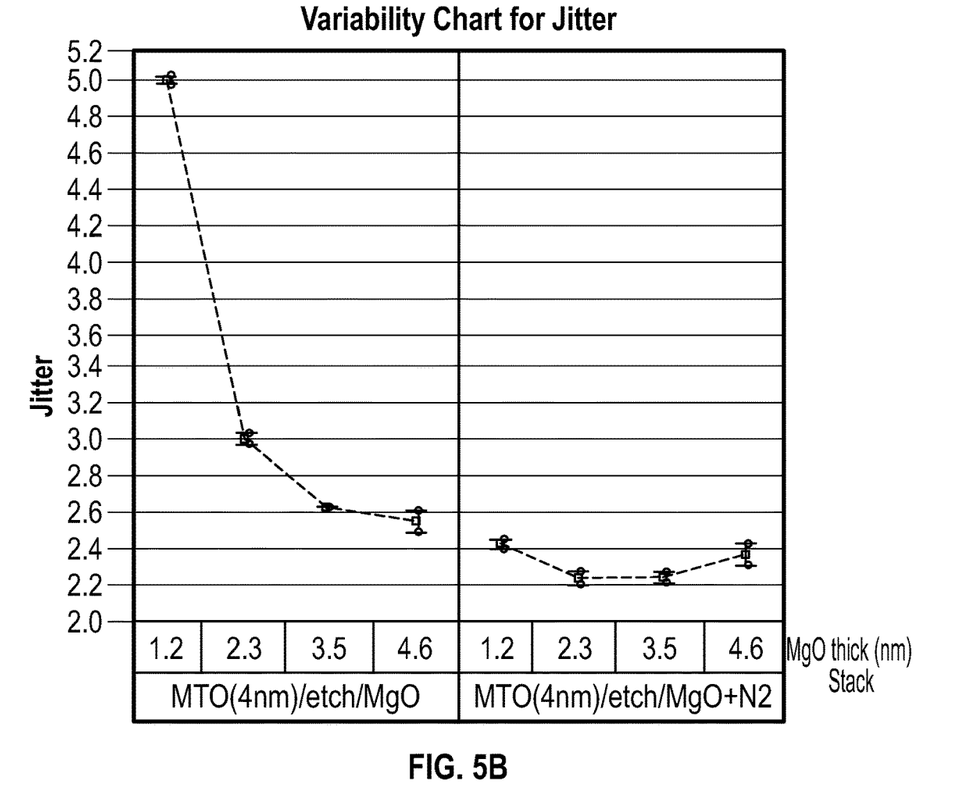
FIG. 5B is a graph comparing transition jitter for a HAMR medium with a multilayer of $MgTiO_x$(Ar only)/MgO(Ar only) and a HAMR medium with a multilayer of $MgTiO_x$(Ar only)/MgO—N(Ar+$N_2$) for various thicknesses of the upper MgO and MgO—N seed layers.
Figure 6:
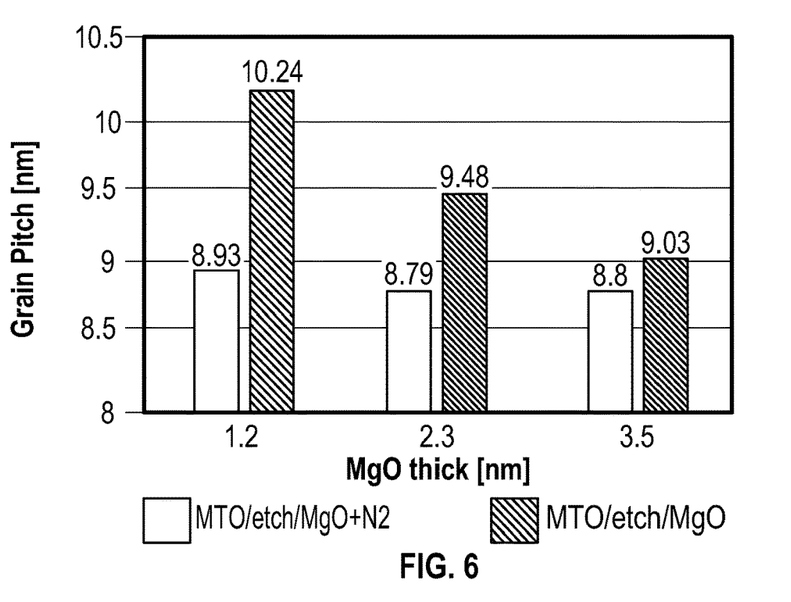
FIG. 6 is a bar chart comparing the FePt recording layer grain pitch for a HAMR medium with a $MgTiO_x$(Ar only)/MgO(Ar only) multilayer and a HAMR medium with a multilayer of $MgTiO_x$(Ar only)/MgO—N(Ar+$N_2$) for various thicknesses of the upper MgO and MgO—N seed layers.

FIG. 5A compares the SNR and FIG. 5B the transition jitter for a multilayer of $MgTiO_x$(Ar only)/MgO(Ar only) with a multilayer of $MgTiO_x$(Ar only)/MgO—N(Ar+$N_2$) for various thicknesses of the upper MgO and MgO—N seed layers. The SNR is worse by at least 0.95 dB and the transition jitter worse by at least 0.27 nm for the multilayer with the MgO(Ar only) upper layer at the thickest value of MgO, and these deltas are larger especially at reduced MgO thicknesses. This is due to the increased grain pitch of the FePt for the media fabricated with the MgO(Ar only) seed layer, as shown by the data in FIG. 6 for three different seed layer thicknesses. It is believed that unstable Ti from the $MgTiO_x$ lower layer has a tendency to diffuse through the upper MgO layer to the recording layer. A transmission electron microscopy (TEM) image of the cross-section of the HAMR medium after the heated deposition of the FePt recording layer shows the presence of nitrogen and Ti at the interface of the $MgTiO_x$ and MgO—N layers. It is believed that some of the nitrogen present during sputter deposition of the MgO reacts with some of the Ti to form a stable TiN phase. This is depicted as diffusion barrier 256 in FIG. 4.

HAMR media with multilayer underlayers like in FIG. 4 were fabricated with a MTO (50% TiO) thermal barrier layer of various thicknesses (2.5 to 5.6 nm) and a 2.3 nm thick MgO—N(sputtered in Ar-28% $N_2$) seed layer. The media were written at equal values of laser power and then measured for SNR, transition jitter and thermal gradient (TG). Compared to a reference media with the conventional single MgO thermal barrier/seed layer (like in FIG. 3), the media with a MTO (4 nm) thermal barrier layer/MgO—N seed layer underlayer exhibited +0.44 dB SNR, −0.13 nm transition jitter, +12.2% down-track TG, and +$^2$1.8% cross-track TG. Thus with HAMR media according to embodiments of this invention the laser power could be reduced to achieve the same performance as the prior art media. This is due to the increased thermal resistivity of the MTO layer over the conventional single MgO layer.

The HAMR media with the MTO/MgO—N underlayer also exhibited significantly better corrosion resistance than HAMR media with a single MgO barrier/seed layer. MgO is the most significant contribution to corrosion in HAMR media due to the reactivity of MgO to moisture in the air. Voids and micropores in the recording layer and overcoat are the paths for moisture to reach the MgO layer. Disk corrosion leads to surface defects which can cause severe head-disk interface issues. The use of the thermal barrier MTO enables a relatively thinner MgO seed layer to be required, which can help reduce disk corrosion. An accelerated corrosion (AC) test was performed for the disk like in FIG. 4 with a MTO (4.0 nm)/MgO—N (2.3 nm) underlayer and for a reference disk with single MgO (4.6 nm) barrier/seed layer like in FIG. 3. The AC test was carried out at 60 deg. C. and 70% relative humidity (RH) for 12 hours. The medium full surface was then scanned optically before and after the AC test to detect and count surface defects (counts/$cm^2$). The disk with the single MgO (4.6 nm) layer exhibited a count of 4531, while the disk with the MTO barrier layer/MgO—N seed layer exhibited a count of only 375.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A heat-assisted magnetic recording (HAMR) medium comprising:
   a substrate;
   a heat-sink layer on the substrate;
   a magnetic recording layer comprising a chemically-ordered alloy selected from a FePt alloy and a CoPt alloy; and
   a multilayered underlayer between the heat-sink layer and the recording layer and comprising a thermal barrier layer consisting of MgO and TiO, a seed layer consisting of MgO and nitrogen (N), and a diffusion barrier comprising Ti and N between the thermal barrier layer and the seed layer, wherein the recording layer is on and in contact with the seed layer.

2. The medium of claim 1 wherein the thermal barrier layer has a composition of the form $MgO_{(100-x)}TiO_{(x)}$, where x is greater than or equal to 40 and less than or equal to 90.

3. The medium of claim 1 wherein the thermal barrier layer has a thickness greater than or equal to 2 nm and less than or equal to 6 nm.

4. The medium of claim 1 wherein the diffusion barrier comprises TiN.

5. The medium of claim 1 wherein the seed layer has a thickness greater than or equal to 1 nm and less than or equal to 5 nm.

6. The medium of claim 1 wherein the heat-sink layer comprises a heat-sink layer selected from one or more of Cu, Au, Ag, Cr, Mo, W and their alloys.

7. The medium of claim 6 wherein the heat-sink layer comprises multiple heat-sink layers.

8. The medium of claim 1 wherein the magnetic recording layer comprises a substantially chemically-ordered alloy comprising Pt and an element selected from Fe and Co, and a segregant selected from one or more of C, $SiO_2$, $TiO_2$, $TaO_x$, $ZrO_2$, SiC, SiN, TiC, TiN, B, BC and BN.

9. The medium of claim 1 wherein the magnetic recording layer comprises a multilayered structure wherein each layer comprises a substantially chemically-ordered alloy comprising Pt and an element selected from Fe and Co, and a segregant selected from one or more of C, $SiO_2$, $TiO_2$, $TaO_x$, $ZrO_2$, SiC, SiN, TiC, TiN, B, BC and BN.

10. The medium of claim 1 wherein the magnetic recording layer comprises a substantially chemically-ordered pseudo-binary FePtX alloy in the $L1_0$ phase, where X is one or more of Ni, Au, Cu, Pd, Mn and Ag.

11. A heat assisted magnetic recording (HAMR) disk drive comprising:
   the medium according to claim 1 wherein said medium is a rotatable HAMR disk; and
   a carrier maintained near the magnetic layer of said medium and supporting a near-field transducer.

* * * * *